Patented Jan. 27, 1925.

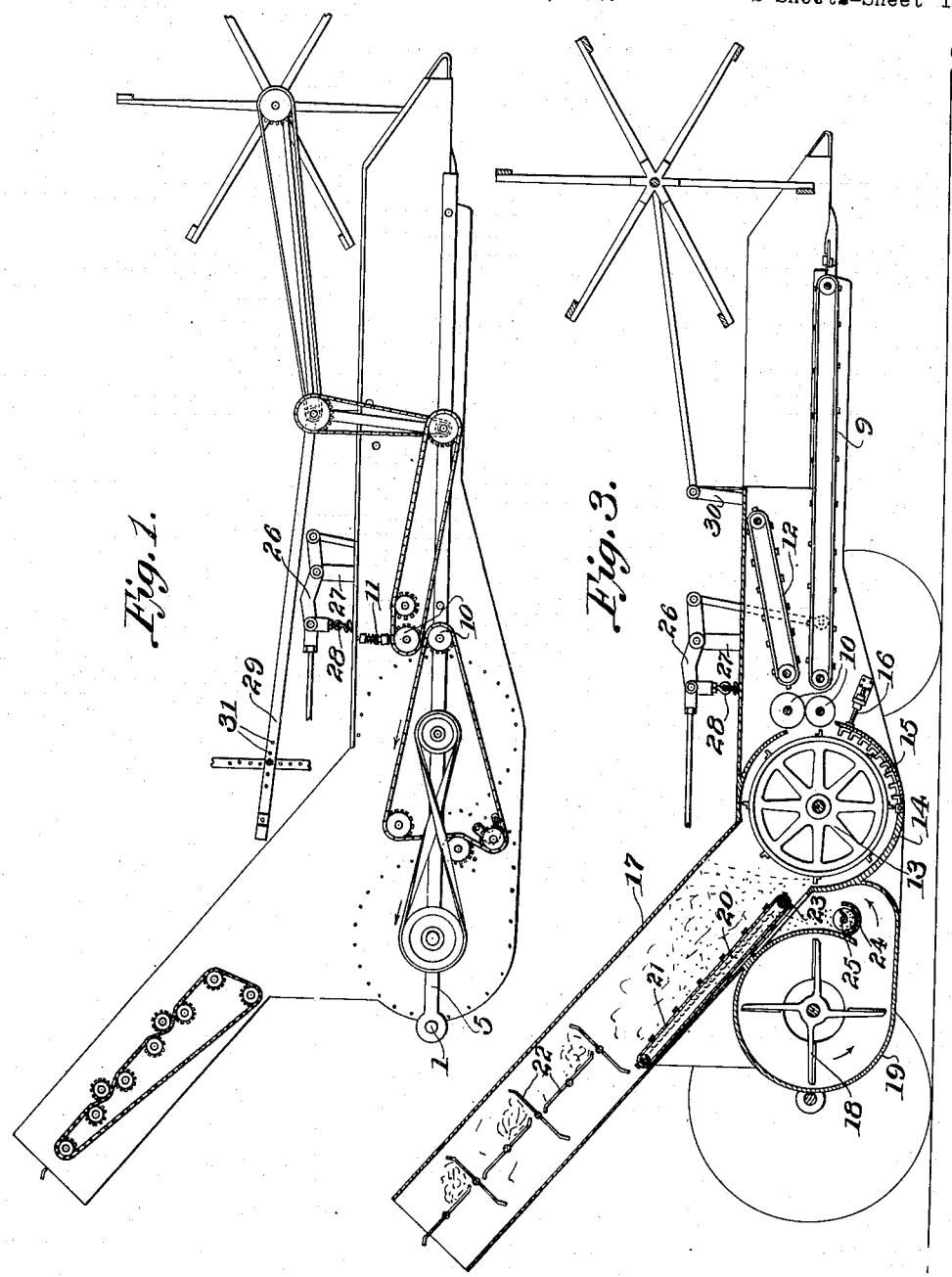

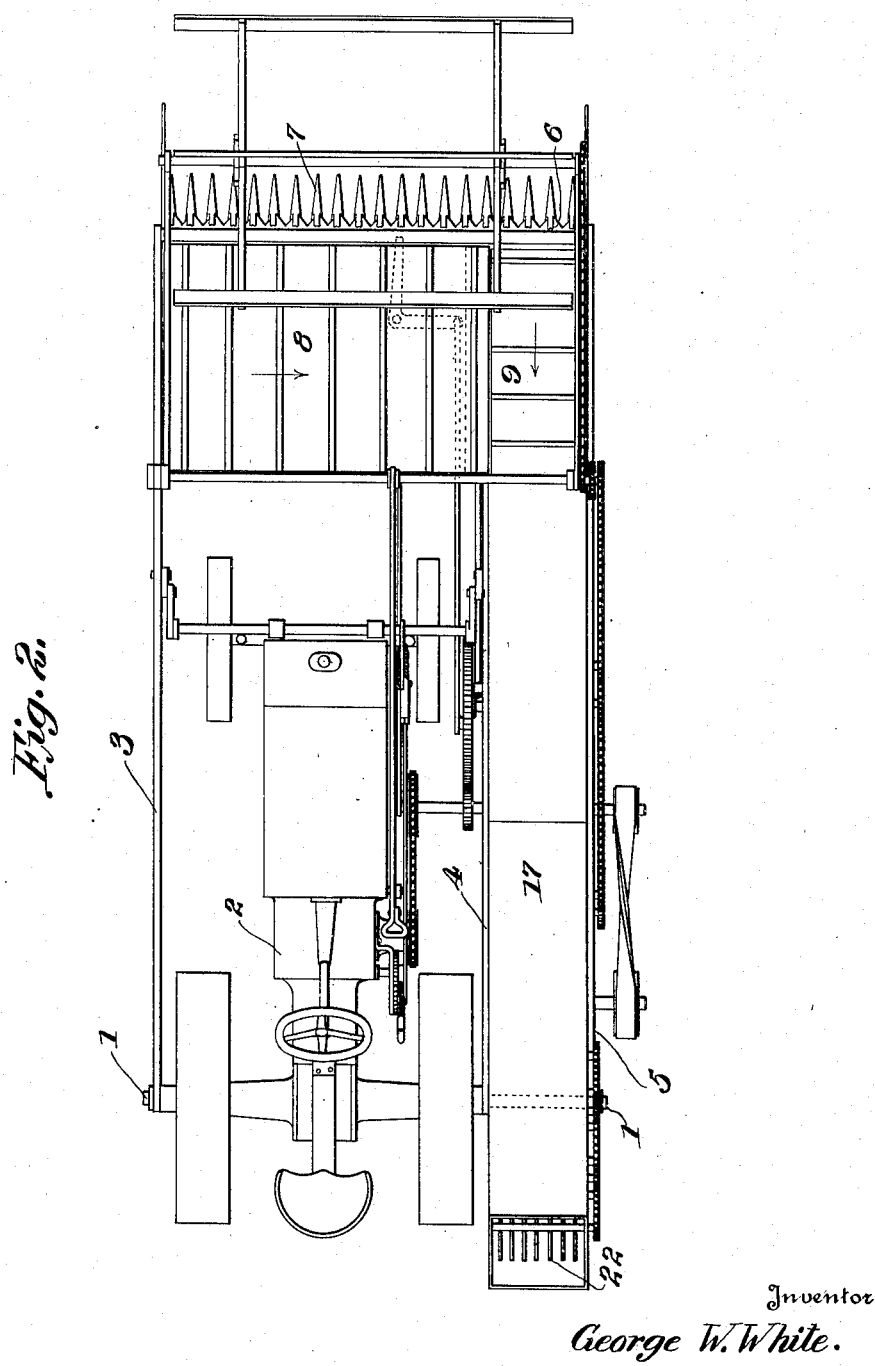

1,524,374

UNITED STATES PATENT OFFICE.

GEORGE W. WHITE, OF HUTCHINSON, KANSAS.

COMBINED HARVESTER AND THRASHER.

Application filed October 6, 1923. Serial No. 666,999.

*To all whom it may concern:*

Be it known that I, GEORGE W. WHITE, a citizen of the United States, residing at 707 South Main Street, Hutchinson, in the county of Reno and State of Kansas, have invented certain new and useful Improvements in Combined Harvesters and Thrashers; and I do hereby declare the following to be a full, clear, and exact description of the invention, such as will enable others skilled in the art to which it appertains to make and use the same.

This invention relates to a combination harvester and thrasher for cutting and threshing grain, and more particularly to a machine which will utilize an air draft immediately behind the cylinder for separating the chaff and straw from the grain while it is being thrown from the cylinder.

An object of my invention is to provide a combination harvester and thrasher for cutting grain in the field, and threshing the same as the machine moves forwardly.

Another object of the invention is to provide a combined harvester and thrasher with resiliently tensioned retarding rollers immediately in front of the cylinder for retarding the passage of the cut grain into said cylinder, whereby the same may be repeatedly beaten by the cylinder to thoroughly thresh the grain from the head.

Other objects will appear as the description proceeds.

In the accompanying drawings which form a part of my application,

Figure 1 is a side elevation of my combination harvester and thrasher.

Figure 2 is a plan view of the same shown attached to a tractor, and

Figure 3 is a longitudinal sectional view of the combined harvester and thrasher.

Like characters of reference are used throughout the following specification, and accompanying drawings to designate corresponding parts.

My combined harvester and thrasher is attached to the driving hubs 1 of a tractor 2, by means of the forwardly extending bars 3, 4 and 5, which terminate with, and are bolted to the cutter bar 6.

The usual form of guard 7 is positioned adjacent the cutter bar 6 and is adapted to cooperate therewith. A platform, or canvas 8 is positioned to the rear of the cutter bar 6, and is adapted to convey the grain as it is cut to the side of the machine and on to the feeding canvas 9, which in turn, conveys the grain toward the threshing mechanism.

A pair of retarding rollers 10 are positioned immediately at the rear end of the feeding canvas and are adjustbly tensioned by means of the springs 11. The canvas 12 is positioned slightly above the feeding canvas 9 and extends at an angle thereto, and assists in pressing or forcing the fluffy grain down and in to the retarding rollers 10.

A cylinder 13 is mounted within the cylinder jacket 14 immediately to the rear of the retarding rollers 10. A concave 15 is positioned in the lower portion of the cylinder jacket 14 and is adjustable by means of the screw 16. A separator tube 17 is positioned slightly above and to the rear of the cylinder 13 and extends at an angle thereto. An air blower or fan 18 is positioned in a casing 19 to the rear of the cylinder 13 and jacket 14, and has an outlet for the air in an upwardly direction immediately to the rear of the said cylinder. The operation of the cylinder throws the wheat, chaff and straw up against the upper surface of the separator tube 17 whereupon the heavier grain will glance off of the tube and fall on to the lip riddle 20, while the force of the air from the fan 18 will blow the chaff and straw on to the straw rack 21 and tumblers 22. The grain will then pass down through the lip riddle 20 and through the grate 23, and in to the auger trough 24 where the auger 25 will convey it to a suitable elevator.

As before mentioned, the cut grain will be thoroughly beaten and separated from the grain heads due to the fact that it is retarded by retarding rollers and not permitted to be jerked through the cylinder without giving it sufficient time to thoroughly thresh the grains from the heads. The pressure of air being directed into the separator tube immediately to the rear of the cylinder will cause continuous action on the threshed grain so that the straw and chaff being lighter than the grain, will be continuously blown and discharged from the end of the separator tube, while the grain being heavier, will pass down through the lip riddle and grate, into the auger trough. It is often the case that white caps or parts of the grain heads will pass through the lip riddle together with the grain, but due to the construction of the grate, these white caps and grain heads will slide back again into the cylinder where they will again be threshed until the grain is entirely removed therefrom.

A pivoted lever 26 is mounted on the post 27 to elevate or lower the cutter bar on the front end of the machine, and is balanced by a suitable spring 28.

A bar 29 is attached to the reel support 30 and is provided with a plurality of adjustments or openings 31 to adjust the reel to the proper height, and also to permit it to be adjusted forwardly or rearwardly.

Suitable bolts and chains are used to connect the several operable parts of the harvester and thrasher and transmit motion thereto as the machine moves in operation. The mounting of the harvester and thrasher on a tractor is described and claimed in my co-pending application, No. 667,000, executed under even date herewith.

Many minor changes in detail of construction may be resorted to without departure from the spirit of the invention.

Having thus described my invention, what I claim as new and desire to secure by Letters Patent of the United States, is:

1. In a combined harvester and thrasher, the combination of a cylinder, a separator tube in communication therewith, means for feeding and retarding grain to said cylinder, an air blower positioned immediately to the rear of said cylinder for separating the chaff and straw from the wheat and means for permitting white caps and portions of grain heads to be repeatedly returned to the cylinder until the grain has been threshed therefrom.

2. In a combined harvester and thrasher, the combination of a cylinder, a separator tube in communication therewith, means for feeding grain to said cylinder, means positioned immediately to the rear of said cylinder for separating the chaff and straw from the wheat as it is thrown from said cylinder, and a lip riddle positioned between said fan and the rear of said cylinder.

In testimony whereof I affix my signature.

GEORGE W. WHITE.